United States Patent [19]

Lopez

[11] Patent Number: 4,679,295
[45] Date of Patent: Jul. 14, 1987

[54] MODULAR MACHINE TOOL FOR SERIES MACHINING OF PARTS IN A BAR

[75] Inventor: Angel Lopez, Les Geneveys-sur-Coffrane, Switzerland

[73] Assignee: Jean Greub S.A., La Chaux-de-Fonds, Switzerland

[21] Appl. No.: 879,102

[22] PCT Filed: Oct. 11, 1985

[86] PCT No.: PCT/CH85/00153
§ 371 Date: May 30, 1986
§ 102(e) Date: May 30, 1986

[87] PCT Pub. No.: WO86/02305
PCT Pub. Date: Apr. 24, 1986

[30] Foreign Application Priority Data

Oct. 16, 1984 [CH] Switzerland .......................... 4942/84

[51] Int. Cl.[4] .......................... B23P 23/00; B23Q 7/04
[52] U.S. Cl. .................................. 29/564.8; 29/564.6;
29/DIG. 15; 226/120; 408/70; 409/137;
409/159; 409/172; 414/750; 414/751
[58] Field of Search ...................... 29/33 Q, 33 S, 564,
29/564.1, 564.6–564.8, DIG. 15, 563; 409/137,
157–159, 161, 172, 173; 226/120; 414/749–751;
408/69, 70, 234, 236, 237

[56] References Cited

U.S. PATENT DOCUMENTS

| | | | |
|---|---|---|---|
| 2,398,239 | 4/1946 | Melin | 408/234 X |
| 3,187,429 | 6/1965 | Fox | 29/564 |
| 3,661,050 | 5/1972 | Erikson | 409/157 |
| 3,800,383 | 4/1974 | Khambatta et al. | 29/148.4 A |
| 3,976,386 | 8/1976 | Marantette et al. | 408/236 X |
| 4,218,877 | 8/1980 | McLain | 29/564 X |
| 4,388,029 | 6/1983 | Durr et al. | 409/137 X |

FOREIGN PATENT DOCUMENTS

| | | |
|---|---|---|
| 1906566 | 8/1970 | Fed. Rep. of Germany . |
| 3207076 | 9/1983 | Fed. Rep. of Germany . |
| 1238130 | 6/1960 | France . |
| 1406665 | 6/1965 | France . |
| 2145065 | 2/1973 | France . |
| 379879 | 8/1964 | Switzerland . |
| 500809 | 2/1971 | Switzerland . |
| 1582337 | 1/1981 | United Kingdom . |

Primary Examiner—Gil Weidenfeld
Assistant Examiner—Steven C. Bishop
Attorney, Agent, or Firm—Frost & Jacobs

[57] ABSTRACT

The machine tool comprises one or several modules comprising a rigid chassis formed of a lower tubular frame (11) and an upper tubular frame (12). The lower frame forms a case containing a lubricating unit and an apparatus for the removal of chips (17). The upper frame (12) has the form of a prism of which two sides (18 and 19) in the form of isoceles triangles are connected by a connecting beam (20) of square section whose faces are inclined at 45° with respect to the vertical. A mobile swivel support (23) is disposed astride the connecting beam (20). This swivel support carries two machining units (24 and 25) mounted symmetrically with respect to the axis (27) of a bar of raw material. Each machining unit comprises a spindle (28) actuated by a motor (29) and a device for displacing the spindle along three axes. The swivel support (23) may be turned around on the beam (20). It may also be prepared beforehand and programmed on a module outside the machine.

12 Claims, 3 Drawing Figures

MODULAR MACHINE TOOL FOR SERIES MACHINING OF PARTS IN A BAR

BACKGROUND OF THE INVENTION

The present invention relates to a modular machine tool for machining series of parts from a bar of raw material, said machine comprising at least one module equipped with at least one machining station, a device for tranporting and maintaining the bar of material in position, and a device for indexing said bar, said machining station comprising at least one machining unit equipped with independent drive means designed for displacing said unit with respect to the bar of raw material.

Modern machine tools of the numerically controlled type, wherein the parts to be machined undergo computer-controlled linear or circular transfer, may be considered as improvement derived from conventional machine tools wherein the parts to be machined are positioned and then withdrawn manually. However, the general principles underlying these two generations of machines remain the same. Thus, in both cases, the raw material is cut up, possibly preworked to form a blank which is next placed in pre-positioning elements designed to maintain it in position when machining, and is then machined to obtain the final part. The prepositioning elements consist of jigs adapted to each particular part to be machined. These jigs must be designed and made according to the parts and can generally not be reutilized for other parts.

The numerically controlled machines moreover necessitate linear or circular transfer units comprising complicated mechanisms which must be adapted to the form and dimensions of the parts to be machined.

These well known problems result in a limitation of the production rates and lead to a relatively high cost of machining the parts in spite of the automation of transfer and machining of the parts.

The complexity of these machines essentially designed for manufacturing large series of parts moreover renders setting up the manufacture of each new series of parts slow and complicated and considerably reduces the flexibility of their use, so that the plant is forced to manufacture great amounts of parts and to thus constitute important stocks, which often involves a non negligible risk for the plant management.

In order to simplify the transfer operations and facilitate transition from one series to another, modular machines have been designed, comprising several machining modules which may be changed and prepared in advance for a new manufacturing operation.

For example, Swiss patent CH-A No. 500 809 describes a modular machine tool of the type indicated in the preamble, comprising a frame provided with rails along which several slides are distributed and respectively carry on one hand a machining module and on the other hand means for supporting and transporting the bar of raw material. The machining modules may operate independently of each other. They are freely mounted by means of springs on their respective slides and they are positioned with respect to the bar by means of conical indexing rods which are engaged in indexing holes provided in the bar.

However, this machine has certain drawbacks. Mounting the machining modules on the slides circulating on a common track does not permit the number and/or the disposition of the modules to be readily modified or to readily replace one of them. Moreover, the utilization of special slides for supporting and advancing the bar complicates the machine, increases its length and raises the loss of material at the extremeties of the bars. On the other hand, the support device does not permit fixing the machining unit with respect to the bar in a sufficiently rigid manner to permit the use of a machining unit which is mobile along three orthogonal axes. Another drawback is the fact that the rails receive the chips and are dirtied.

SUMMARY OF THE INVENTION

An object of the present invention is to meet the above-mentioned drawbacks by means of a machine tool of the type mentioned in the preamble, which permits a substantial reduction of the time and cost of setting up the manufacture of new series of parts while at the same time ensuring a high machining precision.

A rigid chassis preferably comprises a lower frame forming a case and an upper prism-shaped frame, the lower frame being designed to contain at least one lubricating unit and/or at least one apparatus for removing the chips, the upper frame comprising the connecting beam and end elements connecting this beam to the lower frame. The lower frame and the upper frame are preferably made of welded metallic tubes filled with cellular concrete and the lower frame comprises feet provided with air cushions.

According to a preferred embodiment, the connecting beam is of square section, its faces being inclined at 45° with respect to the vertical. The upper faces of the connecting beam may comprise tempered and precision-ground surfaces.

Each machining station preferably comprises a swivel support having the general shape of an inverted U, disposed astride the connecting beam, and supports in the form of clamps, solid with the swivel support, to carry the bar and fix it rigidly on either side of the machining station. These supports may be advantageously disposed in such a manner that the axis of the bar is situated in the vertical plane containing the axis of the connecting beam.

The swivel support preferably carries two machining units mounted symmetrically with respect to the axis of the bar of raw material. Each machining unit may comprise at least one spindle associated with a drive motor and a device designed to displace this spindle with respect to the swivel support along three orthogonal axes X, Y and Z and an axis of inclination A. The machining may comprise means for creating air cushions between the connecting beam and the swivel support, to provide for displacement of the support with respect to the beam. A device for indexing the bar is preferably solid with the swinging support, to provide for centering the machining units on the marks of the bar, by movement of the swivel support along the beam.

Each machining module may advantageously comprise means for computer-controlled numerical control, these means being adapted to store a program.

DESCRIPTION OF BEST MODE

The present invention may be batter understood with reference to the following description by way of example of a preferred embodiment and the accompanying drawings wherein.

Figure 3:
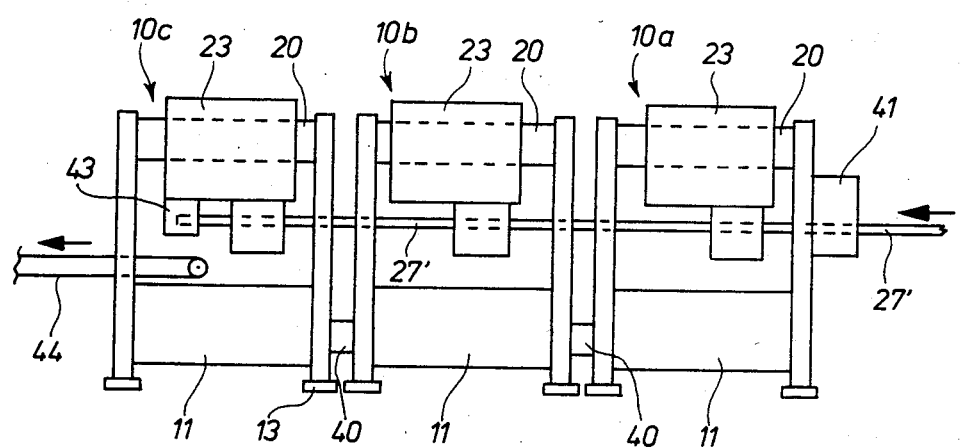

FIG. 3 schematically represents a machine comprising three modules.

The machine tool here described consists of one or several modules juxtaposed in extension of each other, these modules each comprising at least one machining station adapted to at least partially machine the part directly from the raw material, in such a manner that this part is terminated or quasi terminated on exit from the machining station of the last module of the machine tool.

Figure 1:
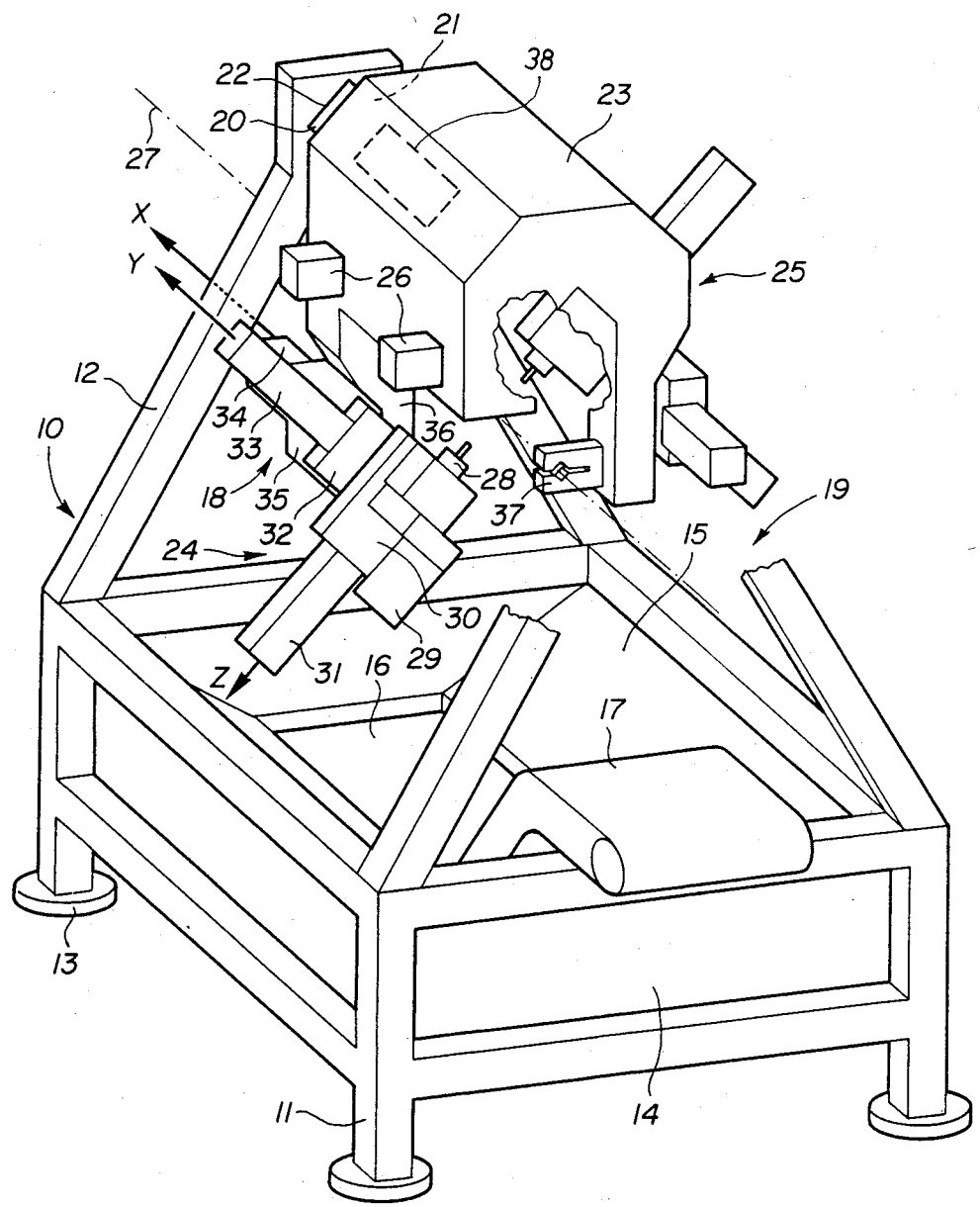
FIG. 1 represents a schematic perspective view of a modular machine tool according to the invention.
Figure 2:
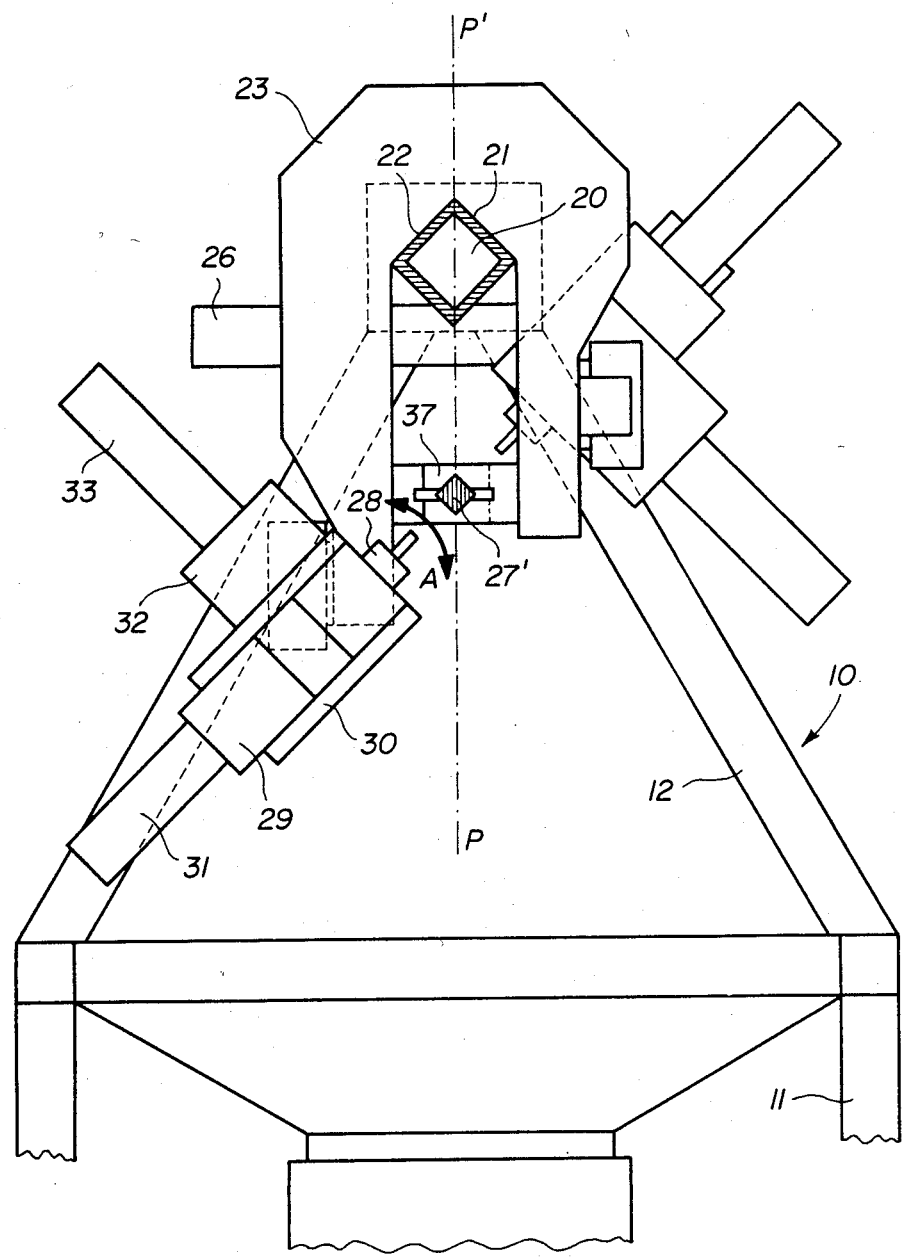
FIG. 2 represents an elevation view of the module shown in FIG. 1.

With reference to FIGS. 1 and 2, each module 10 comprises a rigid chassis advantageously consisting of a lower frame 11 made of steel tubes, preferably disposed along the sides of a parallelepiped rectangle, and of an upper frame 12 advantageously arranged along the sides of a prism mounted on the lower frame.

In order to obtain a particularly rigid structure designed to dampen vibrations during operation, while being simple and inexpensive to fabricate, the steel tubes of the lower and upper frames are preferably filled with cellular concrete. Their form is chosen so that several modules may be easily juxtaposed. The chassis preferably rests on four feet 13 provided with air cushions which permit rapid and easily displacement of the different modules when setting up a machining line with several modules, designed for the fabrication of a given series of parts.

The lower frame constituting the base of the structure comprises lateral walls 14 which, in association with the tubular structure of the lower frame 11, form a case capable of containing different types of equipment. One part of this equipment is in particular the lubricating system with an oil tank and a high discharge pump (not shown) whereby to ensure effective lubrication of the tooling mounted on the machining unit. Another part of this equipment, also consists of the inner wall 15 inclined with respect to the horizontal and serving to direct the chips towards a central area 16, associated with a conveyor belt or an elevator belt 17 arranged to dump the chips on a discharge system (not shown). When several modules are juxtaposed, the discharge system, which may consist for example of a conveyor belt displaced perpendicularly with respect to the belt 17, is replaced with a relay conveyor belt designed to take up the chips and transfer them at the end of the line to a single container from which they are finally evacuated.

The prismatic structure of the upper frame 12 ensures a maximum rigidity of the assembly, relatively reduced space requirements with a great useful volume. The two extremities 18 and 19, in the form of isoceles triangles, of the upper frame, are connected at their upper end by means of a horizontal connecting beam 20 of square cross-section whose faces are inclined at 45° with respect to the vertical. The upper faces 21 and 22 present tempered and precision-ground surfaces which serve as a bearing for a swivel support 23 carrying a pair of machining units 24 and 25. This swivel support is designed for displacement on air cushions along the upper faces 21 and 22 of the connecting beam 20, by known means such as endless screws. Fixation of the swivel support 23 with respect to the beam 20 may be effected by means of locking elements schematically represented by the connectors 26.

Two machining units 24 and 25 are preferably mounted symmetrically with respect to the axis 27 of the bar of raw material (not shown). To balance the forces exerted on the bar, these two units operate simultaneously in opposition. They each comprise one or more machining spindles connected to one or several driving motors 29. One or several spindles may be equipped with an automatic tool changer.

The motor 29 is mounted on a support 30, mobile in translation on the slide 31 defining an axis Z. This slide is itself solid with a second support 32 mobile in translation on a second slide perpendicular to the preceding one and defining an axis Y. This second slide 33 is solid with a third slide 34 defining an axis X perpendicular to the plane formed by the slides 31 and 33 and parallel to the connecting beam 20, which may be axially displaced within a third support 35 mounted rigidly on a lateral protuberance 36 of the swivel support 23. Displacement along these slides which are preferably of the dove-tail type, is produced by independent motors individually controlled by a computer according to the final shape of the part to be machined. To this end, the mobile elements are equipped with D.C. motors with current control utilizing a tachogenerator for speed control. A linear scale solid with each slide or a rotary encoder (not shown) is utilized for controlling the position of the support 30. Screws with planet rolls, of a type known per se, serve as jacks for displacing the supports along the slides. In addition, each spindle 28 is preferably mounted on its support so as to be able to swing about a transversal axis of inclination, according to the double arrow A in FIG. 2. The maximum inclination is equal to 45° on each side of the straight line position of the spindle.

Various spindles 28 may be mounted on the support 30 of the machining unit according to the operations to be effected. These operations are in general: drilling, boring, milling, mechanical or electronic threading. Drilling is preferably effected by numerical control with or without fettling by different standard routines. Milling may be effected in two or three dimensions by means of straight-line or circular interpolation. Threading of the electronic "intelligent" type is effected by means of the following elements:

A mechanical spindle equipped with clamps serving to fix the tap to allow it to rotate.

The spindle may be mounted on a set of springs to render it floating with respect to a median stop in advance-reverse direction.

The spindle is driven by a D.C. motor with speed control (a potentiometer allowing the speed of the tap to be adjusted), and torque control (a potentiometer allowing the force of rotation of the tap to be adjusted).

The D.C. motor is advantageously equipped with a rotating encoder for controlling the number of revolutions. The number of revolutions to be effected by the tap is programmed in a number of entire revolutions and in tenths of a revolution.

For threading of the electronic type, the support 30m akes the spindle 28 advance along the slide 31, according to the axis Z, until the tap bears on the hole to be threaded and until a spring is loaded. Numerical control requires the motor 29 of the threader to rotate a programmed number of revolutions. The motor effects this number of revolutions with a force corresponding to the torque adjustment. If the programmed torque is lower than the mechanical force necessary to effect threading, the tap turns backwards to its starting position, then again goes forward. If after a predetermined number of trials, the programmed number of revolutions can not be attained, the tap returns to its starting point and triggers off an alarm system. On the other hand, if this number can be achieved, the next operations of the program are normally effected.

The bar of raw material which may be of square, rectangular, round or profiled section, defined by its axis 27, is carried and fastened by supports 37 in the form of clamps solid with the swivel support 23. Their role consists in locking the bar ahead of and beyond the zone to be machined in which the piece is formed.

To permit positioning of the bar of raw material, indexing marks are made on this bar which preferably consist of closed or traversing holes or of simple or multiple slits drilled or milled over the whole length thereof. These marks may be executed either by the machining unit of the first module of the machine, or by a specific apparatus mounted on this module or disposed before it. An indexing device (not shown) is solid with the swivel support 22, immediately behind or before one of the supports 37. Indexing is effected by means of gauge rods when the marks are holes or by means of an index or a comb, when they consist of slits. However, this indexing device may likewise be independent of the machining module, the bars introduced into the module having been previously indexed.

The machining units 24, 25 each comprising one or several spindles 28, are indexed with respect to the bar either by displacement on an air cushion of the swivel support 23 along with the connecting beam 20, or by automatic correction of the position of the spindles 28, detected by means of electronic control and by control of the displacement of these spindles along the axis X parallel to the connecting beam 20.

In the first case, indexing is effected directly on the marks applied to the bar. The swivel support 23 is then locked in position by means of the clamping members 26. In the second case, the numerical control corrects its program origin while the swivel support 23 remains locked in position on the connecting beam 20.

This arrangement of the elements: machining units, indexing device, support for locking the bar and the bar itself, forms a rigid and independent assembly, utilizing the structure and its connecting beam 20 as a spatial guiding and positioning element.

To operate with programmed numerical control, each machining module comprises, preferably on the swivel support 23, a controlled numerical control unit 38 (CNC), naturally comprising a program memory. The equipment 38 of the modules may be interconnected or connected to a central control board. Each swivel support 23 may be removed from the beam 20 and placed on another module, for example a preadjusting module which is outside the machine, thereby allowing the tools to be mounted outside the working module, charging the memory with the program relating to the next part to be machined, an operating test and possibly an automatic correction of the program, especially in response to a unit for measuring the diameters and the length of the tool. One may likewise turn the swivel support by 180°, which allows the spindles 28 to reach two other faces perpendicular to those reched in the original position. Thanks to the range of inclination A of 90° of the two spindles 28 and thanks to this posibility of turning the swivel support around, the field of possible inclination extends over 360% in the transversal plane of the bar.

As is shown more particularly in FIG. 2, the bar 27', of square or other section, traverses each module in a position such that its axis 27 is parallel to the axis of the connecting beam 20 and is situated in the vertical plane PP' containing the axis of this connecting beam. Feeding the machine with the bar is effected for example by means of an inclined plane or by a device commercially known by the name of HYDROBAR$^R$.

With regard to controlling the machine during operation, it may be noted that each machining spindle may be displaced independently along its axes X, Y, Z and A by its control means. The information system of each module synchronizes, with respect to all other components, the entire modular machine by means of a central computer or programable control means. An information support, such as a magnetic tape, a perforated band, etc, corresponding to each type of part to be machined, controls all components of the machine.

FIG. 3 schematically illustrates the arrangement of the machine according to the invention, comprising three successive machining modules 10a, 10b and 10c which are aligned for machining a given series of work pieces in a bar 27'. In general, each of the three modules comprises the essential elements described above, especially a respective swivel support 23 mounted on a horizontal beam 20 associated with each module. The three swivel supports 23 may be equipped with different tools. To ensure correct alignment of the three modules 10a to 10c, one simply provides between their respective lower frames 11, aligning elements 40 which may be simple guide members, utilized only when a machining module is brought forward by causing it to slide on its air-cushion feet 13, for alignment with respect to the preceding module.

In the represented example, the first machining module 10 comprises complementary equipment consisting of an automatic marking apparatus 41 serving to place indexing marks on the bar 27'. This known apparatus comprises more particularly a set of fixed jaws and a set of mobile jaws with an adjustable displacement which is equal to the step of the parts along the bar, as well as a drill for making indexing holes.

At the other end of the machine, the machining module 10c comprises a cutting device 43 which is associated with the swivel support 23 and which cuts up the bar 27' to detach the completely machined parts therefrom, which are evacuated by a conveyor 44. This cutting device may be associated with a machining unit which machines the cut face of the bar after cutting.

Each module is able to operate in a totally independent fashion. To this end, it comprises its numerical control program, its own spindle driving motors, its own control members, its own chucking and indexing elements and its own means for control and correction of the tool diameters and lengths.

The utilization of such a machine provides the following advantages:
  it ensures rapid and precise positioning of the machining units with respect to the bar,
  it permits easy changing of the machining units by removal of the corresponding swivel supports and thanks to the possibility of preadjustment and trial of the machining units outside the machine,
  it permits to rapidly set up the manufacture of new series of parts, thanks to the use of machining units of a universal nature utilizing numerical control,
  it permits the cost of setting up manufacture to be reduced thanks to the consequent reduction of the number of tool sets and specific positioning elements, it is inexpensive in labor costs thanks to automatic passage of the bar from one module to the other without human intervention, it permits the production rate to be increased thanks to a great number of tools being simultaneously engaged, it permits different and complex shapes to be fabricated thanks to the possibility of passing the bar successively several times between the modules, it allows a reduction of stocks due to the flexibility and rapidity of bringing out new series of parts, thus permitting production in small series with frequent renewals, the reduction of stocks permits a decrease of the immobilization of capital as well as a reducton of storage areas.

The present invention is not limited to the embodiments described above by way of example. It effectively extends to all modifications or variants which are obvious to those skilled in the art.

I claim:

1. A modular machine tool for machining series of parts from a bar of raw material, said machine tool comprising at least one module equipped with at least one machining station, means for transporting a bar of raw material in position and maintaining said bar in position, an indexing device for forming indexing marks on said bar, said machining station comprising at least one machining unit having independent drive means adapted to displace said machining unit with respect to said bar of raw material, each said module being provided with a rigid chassis comprising a rectilinear connecting beam disposed parallel to said bar of raw material, said machining station forming a part of said module being swingably mounted on said connecting beam, and said chassis comprising a lower frame forming a case and an upper prism-shaped frame, said lower frame being configured to contain at least one of a lubricating unit and means for the removal of chips, said upper frame comprising said connecting beam and end elements connecting said beam to said lower frame.

2. Machine tool according to claim 1, wherein said lower frame and said upper frame are made of welded metallic tubes filled with cellular concrete, and wherein feet provided with air cushion means are connected to said lower frame.

3. Machine tool according to claim 1, wherein said connecting beam is of square section, the faces of said square section being inclined at 45° with respect to the vertical.

4. Machine tool according to claim 3, wherein said connecting beam has upper faces comprising tempered and precision-ground surfaces.

5. Machine tool according to claim 1, wherein each said machining station includes a swivel support generally shaped in the form of an inverted U disposed astride said connecting beam, and supports in the form of clamps solid with said swivel support, whereby to carry said bar and fix it rigidly on either side of said maching station.

6. Machine tool according to claim 5, wherein said supports are disposed in such manner that the axis of said bar is situated in the vertical plane containing the axis of said connecting beam.

7. Machine tool according to claim 5, wherein said swivel support is provided with two machining units mounted symmetrically with respect to the axis of said bar of raw material.

8. Machine tool according to claim 7, wherein each said machining unit comprises at least one spindle associated with a driving motor and means to displace said spindle with respect to said swivel support along three orthogonal axes and an axis of inclination.

9. Machine tool according to claim 5, including means for creating air cushions between said connecting beam and said swivel support, in order to provide for displacement of said support with respect to said beam.

10. Machine tool according to claim 1, wherein each said machining module includes means for computerized numerical control, said means being provided for storing a program.

11. Machine tool according to claim 5, wherein each said machining module comprises means for computerized numerical control, said means being provided for storing a program.

12. Machine tool according to claim 7, wherein said indexing device is integral with said swivel support, in order to center said machining units on said indexing marks on said bar, by movement of said swivel support along said connecting beam.

* * * * *